US011328438B2

(12) United States Patent
Yasunaga et al.

(10) Patent No.: US 11,328,438 B2
(45) Date of Patent: May 10, 2022

(54) IMAGE PROCESSING SYSTEM AND IMAGE PROCESSING METHOD

(71) Applicant: TOSHIBA TEC KABUSHIKI KAISHA, Tokyo (JP)

(72) Inventors: Masaaki Yasunaga, Nagaizumi Sunto Shizuoka (JP); Norimasa Ariga, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/081,531

(22) Filed: Oct. 27, 2020

(65) Prior Publication Data

US 2021/0042953 A1    Feb. 11, 2021

Related U.S. Application Data

(63) Continuation of application No. 16/182,468, filed on Nov. 6, 2018, now abandoned.

(30) Foreign Application Priority Data

Nov. 7, 2017 (JP) .............................. JP2017-214553

(51) Int. Cl.
*G06T 7/593* (2017.01)
*G06V 10/10* (2022.01)
(Continued)

(52) U.S. Cl.
CPC ................ *G06T 7/593* (2017.01); *G06T 7/70* (2017.01); *G06V 10/10* (2022.01); *H04N 5/2256* (2013.01);
(Continued)

(58) Field of Classification Search
CPC ............ G06K 9/20; G06T 2207/10012; G06T 2207/10028; G06T 7/521; G06T 7/593;
(Continued)

(56) References Cited

U.S. PATENT DOCUMENTS 5,566,280 A    10/1996   Fukui et al.
6,369,831 B1    4/2002   Baba et al.
(Continued)

FOREIGN PATENT DOCUMENTS

JP    H04-106672 A    4/1992
JP    H11-248435 A    9/1999
(Continued)

OTHER PUBLICATIONS

Final Office Action on U.S. Appl. No. 16/182,468 dated Jul. 27, 2020.
(Continued)

*Primary Examiner* — Peter D Le
(74) *Attorney, Agent, or Firm* — Foley & Lardner LLP

(57) ABSTRACT

An image processing system includes a camera interface and a processor. The camera interface acquires a captured image from at least one camera that images an article. The processor acquires a basic shape of the article and acquires an image captured with imaging parameters corresponding to the basic shape from the at least one camera through the camera interface.

19 Claims, 7 Drawing Sheets

(51) Int. Cl.
*G06T 7/70* (2017.01)
*H04N 5/225* (2006.01)
*H04N 5/232* (2006.01)
*G06T 7/521* (2017.01)
*H04N 13/204* (2018.01)
*H04N 5/247* (2006.01)
*H04N 13/00* (2018.01)

(52) U.S. Cl.
CPC ......... *H04N 5/23203* (2013.01); *G06T 7/521* (2017.01); *G06T 2207/10012* (2013.01); *G06T 2207/10028* (2013.01); *H04N 5/247* (2013.01); *H04N 13/204* (2018.05); *H04N 2013/0081* (2013.01)

(58) Field of Classification Search
CPC .................... G06T 7/70; H04N 13/204; H04N 2013/0081; H04N 5/2256; H04N 5/23203; H04N 5/247
See application file for complete search history.

(56) References Cited

U.S. PATENT DOCUMENTS

| | | |
|---|---|---|
| 10,430,962 B2 | 10/2019 | Seto |
| 2001/0043335 A1 | 11/2001 | Norita et al. |
| 2002/0080148 A1 | 6/2002 | Uchino |
| 2003/0035098 A1 | 2/2003 | Ishiyama |
| 2003/0193657 A1 | 10/2003 | Uomori et al. |
| 2005/0237581 A1 | 10/2005 | Knighton et al. |
| 2007/0031028 A1 | 2/2007 | Vetter et al. |
| 2007/0172127 A1 | 7/2007 | Ishiyama |
| 2008/0013049 A1 | 1/2008 | Nishikawa |
| 2008/0118143 A1 | 5/2008 | Gordon et al. |
| 2010/0092041 A1 | 4/2010 | Kim et al. |
| 2010/0328454 A1 | 12/2010 | Yamada |
| 2012/0148145 A1 | 6/2012 | Liu et al. |
| 2013/0114861 A1 | 5/2013 | Takizawa |
| 2013/0127998 A1 | 5/2013 | Kobayashi et al. |
| 2013/0155417 A1 | 6/2013 | Ohsawa |
| 2013/0208084 A1* | 8/2013 | Brunner .................. G06T 11/60 348/36 |
| 2013/0259359 A1 | 10/2013 | Hong et al. |
| 2014/0002687 A1 | 1/2014 | Ko |
| 2014/0240293 A1 | 8/2014 | McCaughan et al. |
| 2014/0267623 A1 | 9/2014 | Bridges et al. |
| 2017/0230584 A1 | 8/2017 | Du et al. |
| 2018/0253596 A1* | 9/2018 | Barman ............. G06K 9/00369 |

FOREIGN PATENT DOCUMENTS

| | | |
|---|---|---|
| JP | 2015-049133 A | 3/2015 |
| JP | 2017-152483 A | 8/2017 |

OTHER PUBLICATIONS

Francis Engelmann: "FabScan Affordable 3D Laser Scanning of Physical Objects", Sep. 30, 2011 (Sep. 30, 2011), XP055573420, Retrieved from the Internet:URL:http://citeseerx.ist.psu.edu/viewdoc/download?doi=10.1.1.405.3642&rep=rep1&type=pdf (retrieved on Mar. 22, 2019), p. 24, p. 36-p. 37, figure 3.6.

Mario Lukas: "FabScan Pi-an open-hardware stand-alone web-enabled 3D scanner", Jul. 9, 2015 (Jul. 9, 2015), XP055573427, Retrieved from the Internet: URL:https://core.ac.uk/download/pdf/36635423.pdf (retrieved on Mar. 22, 2019)Abstract p. 11, p. 25-p. 27, p. 32-p. 41, p. 49, Figures 2.2, 3.4, 3.7, 3.11, 3.13.

Non-Final Office Action on U.S. Appl. No. 16/182,468 dated Mar. 30, 2020.

Search Report dated Apr. 4, 2019 in corresponding European application No. 18 20 4417.2, 10 pages.

Notice of Reasons for Refusal dated Oct. 26, 2021 issued in JP Application No. 2017-214553, with English translation, 8 pages.

Umeda total climbing, Arai Seiko, "Shape recognition using a rough distance image focusing attention on the basic shape of a plane / cylinder," Journal of Scientific Society, vol. 1959, No. to No. 2002, Japanese Society of Precision Engineering, Arai Seiyaku, Jan. 25, 2009, pp. 59-60, p. 05.

* cited by examiner

| BASIC SHAPE | IMAGING PARAMETERS | | |
|---|---|---|---|
| | NUMBER OF CAPTURED IMAGES | IMAGING ANGLE | LIGHTING POSITION |
| CUBIC | 6 PIECES | FRONT SIDE/BACK SIDE/TOP SIDE/BOTTOM SIDE/LEFT SIDE/RIGHT SIDE | DIRECTIONS AS IMAGING ANGLE |
| DISK | 14 PIECES | FRONT SIDE/BACK SIDE/SIDE (FOR EACH 30 DEGREES) | DIRECTIONS AS IMAGING ANGLE |

⋮

IMAGE PROCESSING SYSTEM AND IMAGE PROCESSING METHOD

CROSS-REFERENCE TO RELATED APPLICATIONS

This application is a continuation of U.S. application Ser. No. 16/182,468 filed Nov. 6, 2018, which is based upon and claims the benefit of priority from Japanese Patent Application No. 2017-214553, filed Nov. 7, 2017, the entire contents of which are incorporated herein by reference.

FIELD

Embodiments described herein relate generally to an image processing system and an image processing method.

BACKGROUND

In recent years, an object recognition technique that matches an image of an object with dictionary information to specify an object has been provided. An image processing system for executing such a technique acquires an image of an article and generates dictionary information in advance.

The number of images necessary for generating the dictionary information and an imaging angle are different for each article. Therefore, the image processing system has a problem of capturing unnecessary images.

DETAILED DESCRIPTION

In order to solve the above problem, an image processing system and an image processing method capable of properly capturing an image for generating dictionary information are provided.

According to at least one embodiment, an image processing system includes a camera interface and a processor. The camera interface acquires a captured image from a camera that images an article. The processor acquires a basic shape of the article and acquires an image captured with imaging parameters corresponding to the basic shape from the camera through the camera interface.

Hereinafter, embodiments will be described with reference to drawings.

First Embodiment

First, a first embodiment will be described.

The image processing system according to the first embodiment images an article in order to generate dictionary information. In the image processing system, an article is set at a predetermined position by an operator or the like. The image processing system images the set article and acquires an image of the article.

The dictionary information is information used for object recognition. That is, the dictionary information is information for specifying an object by matching the image of the object therewith. The dictionary information may be an image of an article or information indicating a feature amount of an image of an article.

Figure 1:
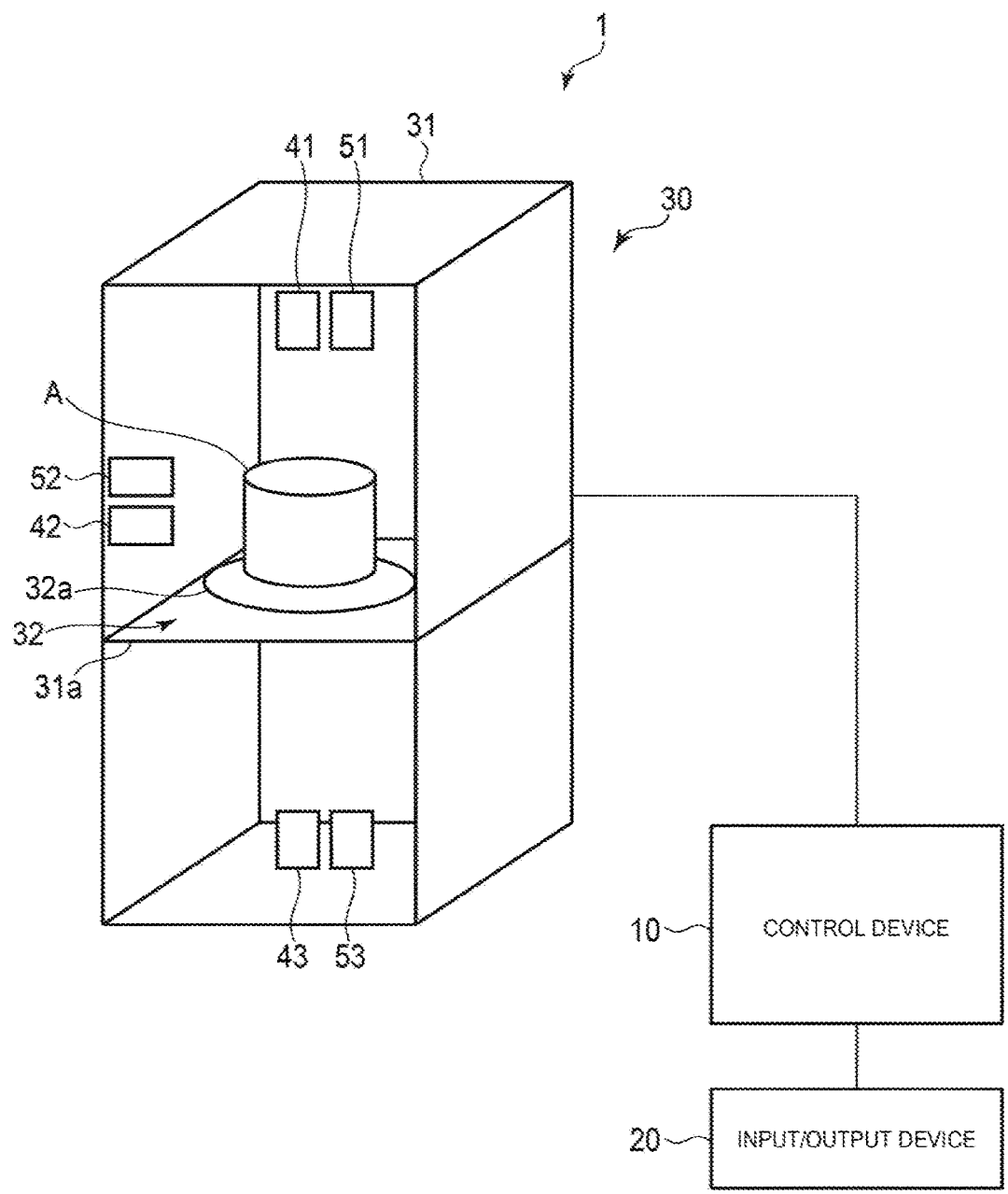
FIG. 1 is a block diagram illustrating a configuration example of an image processing system according to a first embodiment.

FIG. 1 illustrates a configuration example of an image processing system 1. As shown in FIG. 1, the image processing system 1 includes a control device 10, an input/output device 20, an imaging device 30, and the like. The control device 10 is communicably connected to the input/output device 20 and the imaging device 30. Here, it is assumed that the image processing system 1 images an article A.

The control device 10 controls the entire image processing system 1. The control device 10 images the article A by using the imaging device 30 based on an instruction from the operator or the like. For example, the control device 10 receives an instruction input from the operator through the input/output device 20. Further, the control device 10 displays various information to the operator through the input/output device 20.

The input/output device 20 is an interface for receiving an instruction input from the operator and displaying various information to the operator. The input/output device 20 is constituted with an operation unit that receives an instruction input and a display unit that displays information.

The input/output device 20 transmits a signal indicating an operation received from the operator to the control device 10 as the operation of the operation unit. Here, the operation unit has a touch panel.

The input/output device 20 displays various information as the operation of the display unit under the control of the control device 10. For example, the display unit is constituted with a liquid crystal monitor. The display unit is integrally formed with a touch panel as the operation unit.

The operation unit may be constituted with a keyboard or a numeric keypad.

The imaging device 30 images the article A under the control from the control device 10. The imaging device 30 images the article A from various angles.

As shown in FIG. 1, the imaging device 30 is constituted with a housing 31, a turntable 32, cameras 41 to 43, lighting units 51 to 53, and the like. In addition to the configuration as shown in FIG. 1, the imaging device 30 may further have a configuration according to necessity, or a specific configuration may be excluded from the imaging device 30.

The housing 31 is a frame that forms the outer shape of the imaging device 30. The housing 31 is made of resin or the like, for example. The housing 31 is formed in a rectangular parallelepiped shape. The housing 31 is provided with a partition 31a in the middle part in a vertical direction. The partition 31a is formed horizontally. The partition 31a is formed in a rectangular shape according to the shape of the housing 31. In addition, the partition 31a is formed of a transparent material. For example, the partition 31a is an acrylic plate or the like.

The turntable 32, the cameras 41 to 43, and the lighting units 51 to 53 are formed inside the housing 31.

The turntable 32 is formed on the partition 31a. The turntable 32 rotates the article A placed on the top side under the control from the control device 10. For example, the turntable 32 is constituted by a disk 32a on which the article A is placed and a drive unit that rotates the disk. The disk 32a is formed of a transparent material. For example, the disk 32a is an acrylic plate or the like.

The cameras 41 to 43 images the article A under the control from the control device 10. The cameras 41 to 43 transmit captured images obtained by imaging the article A to the control device 10. For example, the cameras 41 to 43 are charge coupled device (CCD) cameras and the like.

The camera 41 (a first camera) images the article A from a predetermined direction. The camera 41 images the top side of the article A. The camera 41 is installed downward on the top side of the housing 31. The camera 41 images the article A from above.

The camera 42 (a second camera) images the article A from a direction orthogonal to the predetermined direction. The camera 42 images the side of the article A. The camera 41 is installed horizontally on the side of the housing 31. The camera 41 images the article A from the side part.

The camera 43 (a third camera) images the article A in a direction opposite to the predetermined direction. The camera 43 images the bottom side of the article A. The camera 41 is installed upward on the bottom side of the housing 31. The camera 41 images the article A from the bottom part.

The lighting units 51 to 53 illuminate the article A under the control from the control device 10. For example, the lighting units 51 to 53 are constituted with light emitting diodes (LED) or the like.

The lighting unit 51 illuminates an area to be imaged by the camera 41. That is, the lighting unit 51 illuminates the top side of the article A. The lighting unit 51 is installed downward on the top side of the housing 31. The lighting unit 51 illuminates the article A from above.

The lighting unit 52 illuminates an area to be imaged by the camera 42. That is, the lighting unit 52 illuminates the side of the article A. The lighting unit 52 is installed laterally on the side of the housing 31. The lighting unit 52 illuminates the article A from the side part.

The lighting unit 53 illuminates an area to be imaged by the camera 43. That is, the lighting unit 53 illuminates the bottom side of the article A. The lighting unit 53 is installed upward on the bottom side of the housing 31. The lighting unit 53 illuminates the article A from the bottom.

Next, a configuration example of the control device 10 will be described.

Figure 2:
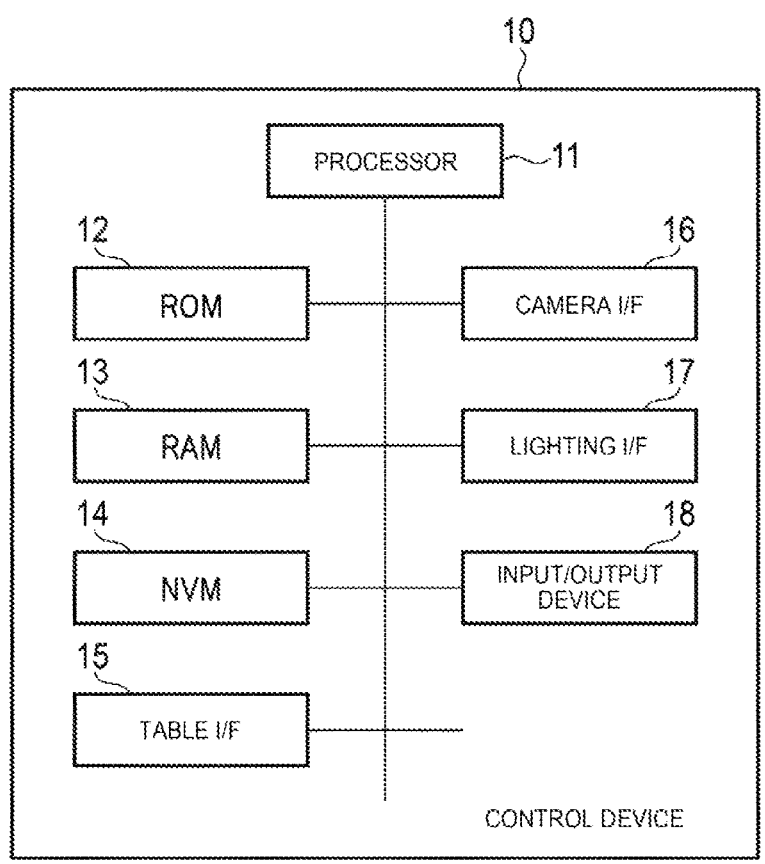
FIG. 2 is a block diagram illustrating a configuration example of a control device according to the first embodiment.

FIG. 2 is a block diagram showing a configuration example of the control device 10. As shown in FIG. 2, the control device 10 includes a processor 11, a ROM 12, a RAM 13, an NVM 14, a table interface 15, a camera interface 16, a lighting interface 17, an input/output interface 18, and the like. The processor 11, the ROM 12, the RAM 13, the NVM 14, the table interface 15, the camera interface 16, the lighting interface 17, and the input/output interface 18 are connected to each other via a data bus or the like.

In addition to the configuration as shown in FIG. 2, the control device 10 may further have a configuration according to the particular application, or a specific configuration may be excluded from the control device 10.

The processor 11 has a function of controlling the overall operation of the control device 10. The processor 11 may include an internal cache and various interfaces, and the like. The processor 11 realizes various processes by executing programs stored in the internal memory, the ROM 12 or the NVM 14 in advance.

Some of the various functions realized by the processor 11 executing the programs may be realized by a hardware circuit. In this case, the processor 11 controls functions executed by the hardware circuit.

The ROM 12 is a nonvolatile memory in which a control program, control data, and the like are stored in advance. The control program and the control data stored in the ROM 12 are incorporated in advance according to the specification of the control device 10. The ROM 12 stores, for example, a program (for example, BIOS) for controlling the circuit board of the control device 10.

The RAM 13 is a volatile memory. The RAM 13 temporarily stores data under processing of the processor 11 and the like. The RAM 13 stores various application programs based on instructions from the processor 11. Further, the RAM 13 may store data necessary for executing the application programs, execution results of the application programs, and the like.

The NVM 14 is a nonvolatile memory capable of writing and rewriting data. The NVM 14 is constituted with, for example, a hard disk drive (HDD), a solid state drive (SSD), an EEPROM (registered trademark) or a flash memory. The NVM 14 stores control programs, applications, various data, and the like according to the operational application of the control device 10.

Further, the NVM 14 stores a parameter table. The parameter table will be described later.

The table interface 15 is an interface for transmitting and receiving data to and from the turntable 32. The table interface 15 transmits a signal for rotating the disk 32a under the control of the processor 11. Further, the table interface 15 may receive a signal indicating the angle of the disk 32a from the turntable 32. For example, the table interface 15 may support a USB connection.

The camera interface 16 is an interface for transmitting and receiving data to and from the cameras 41 to 43. For example, the camera interface 16 transmits a signal for instructing imaging to the cameras 41 to 43 under the control of the processor 11. In addition, the camera interface 16 acquires captured images obtained by imaging from the cameras 41 to 43. For example, the camera interface 16 may support a USB connection.

The lighting interface 17 is an interface for transmitting and receiving data to and from the lighting units 51 to 53. For example, the lighting interface 17 transmits a signal for instructing lighting to the lighting units 51 to 53 under the control of the processor 11. For example, the lighting interface 17 may support a USB connection.

The input/output interface 18 is an interface for exchanging data with the input/output device 20. For example, the input/output interface 18 receives a signal for indicating an operation received from the operator from the input/output device 20. Also, the input/output interface 18 transmits information indicating a screen to be displayed to the operator to the input/output device 20 under the control of the processor 11. For example, the input/output interface 18 may support a USB connection.

Next, the parameter table will be described.

The parameter table shows imaging parameters related to the imaging of the article for each basic shape of the article.

The basic shape is a category of the outline of the article. That is, the basic shape is an approximate shape of the outer shape of the article. For example, the basic shape is a cube, a rectangular parallelepiped, a polygonal prism, a cylinder, a cone, a sphere, a polygonal cone or a plane. The content of the basic shape is not limited to a specific configuration.

The imaging parameters are parameters for capturing an image necessary for generating dictionary information of the article.

Figures 3, 4:
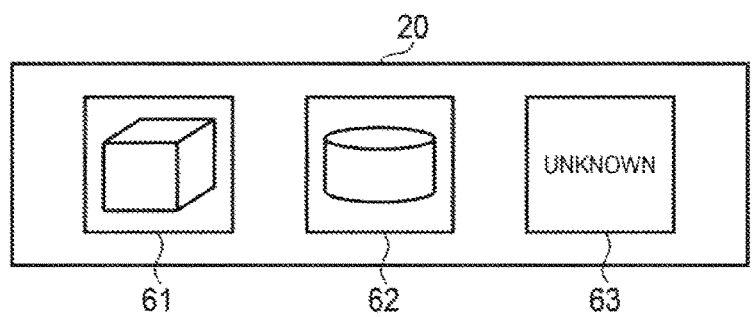
FIG. 3 is a diagram illustrating an example of a parameter table according to the first embodiment.
FIG. 4 is a diagram illustrating a display example of an input/output device according to the first embodiment.

FIG. 3 shows an example of a parameter table. As shown in FIG. 3, the parameter table stores "Basic Shape" and "Imaging Parameter" in association with each other.

"Basic Shape" indicates the names of a basic shape. Further, the "Basic Shape" may be an ID or the like indicating the basic shape.

"Imaging Parameter" indicates imaging parameters of a corresponding basic shape. "Imaging Parameter" stores "Number of Captured Images", "Imaging Angle", and "Lighting Position" in association with each other. In addition to the configuration shown in FIG. 3, the "Imaging Parameter" may further include a configuration according to the particular application, or a specific configuration may be excluded from the "Imaging Parameter".

"Number of Captured Images" indicates the number of images to be captured.

"Imaging Angle" indicates the angle at which a commodity is imaged. For example, "Imaging Angle" indicates a side or the like for imaging an article.

"Lighting Position" indicates a lighting unit to be turned on when the article is imaged. The "Lighting Position" may indicate a lighting unit to be turned on at each imaging angle.

For example, the parameter table indicates, "6 pieces" (number of images to be captured), "front side/back side/top side/bottom side/left side/right side" (imaging angles), and "the same directions as imaging angles" (lighting position) as the imaging parameters of "cube". That is, the parameter table indicates 6 pieces of image of "cubic" article to be captured. Further, the parameter table indicates that the "cubic" article is to be imaged from the front side/back side/top side/bottom side/left side/right side. Further, in the case of imaging an article of "cube", the parameter table indicates that the lighting unit for illuminating the direction in which the camera images is to be turned on.

Next, functions realized by the control device 10 will be described. The functions realized by the control device 10 are realized by the processor 11 executing a program stored in the NVM 14 or the like.

First, the processor 11 has a function of receiving an input of the basic shape of the article A set on the turntable 32.

For example, the processor 11 receives an input of the basic shape of the article A through the input/output device 20. The processor 11 sets the input basic shape.

FIG. 4 shows an example of a screen to be displayed when the input/output device 20 receives an input of a basic shape. As shown in FIG. 4, the input/output device 20 displays icons 61 to 63.

The icon 61 receives an input of "cube" as a basic shape. The icon 62 receives an input of "cylinder" as a basic shape. The icon 63 receives an input that the basic shape is unknown. The input/output device 20 may display an icon for receiving an input of another basic shape.

When detecting the tap on the icon 61 or 62, the processor 11 acquires the basic shape corresponding to the tapped icon 61 or 62. Further, when detecting the tap on the icon 63, the processor 11 recognizes that the basic shape is unknown.

Further, the processor 11 has a function of acquiring imaging parameters corresponding to the basic shape of the article A.

The processor 11 refers to the parameter table and acquires imaging parameters corresponding to the basic shape. The processor 11 sets the acquired imaging parameters.

When the basic shape is unknown, the processor 11 may acquire predetermined imaging parameters.

Further, the processor 11 has a function of imaging the article A according to the acquired imaging parameters.

The processor 11 uses the cameras 41 to 43, the lighting units 51 to 53, and the turntable 32 to image the article A.

For example, in a case where the basic shape of the article A is "cube", in the example shown in FIG. 2, the processor 11 images the "front side/back side/top side/bottom side/left side/right side" of the article A. At the time of imaging, the processor 11 turns on the lighting units 51 to 53 corresponding to the respective cameras 41 to 43.

For example, the processor 11 turns on the lighting unit 51. When the lighting unit 51 is turned on, the processor 11 images the "top side" of the article A by using the camera 41. When imaging the "top side" of the article A, the processor 11 turns on the lighting unit 53. When the lighting unit 53 is turned on, the processor 11 uses the camera 43 to image the "bottom side" of the article A.

When imaging the "bottom side" of the article A, the processor 11 directs the article A in a predetermined direction by using the turntable 32. When the article A is directed in the predetermined direction, the processor 11 turns on the lighting unit 52. When the lighting unit 52 is turned on, the processor 11 images a predetermined side (front side, back-side, left side or right side) of the article A by using the camera 42.

When the predetermined side (front side, back side, left side or right side) of the article A is imaged, the processor uses the turntable 32 to direct the article A in the predetermined direction. When the article A is directed in the predetermined direction, the processor 11 uses the camera 42 to image the other side (front side, back side, left side or right side) of the article A. The processor 11 repeats the above operation to image the front side, back side, left side, and right side of the article A.

The processor 11 may simultaneously image the top side, the bottom side, and one side of the article A.

The processor 11 may store the captured image in the NVM 14. Further, the processor 11 may store the captured image in an external memory. In addition, the processor 11 may transmit the captured image to the external device.

Next, an operation example of the control device 10 will be described.

Figure 5:
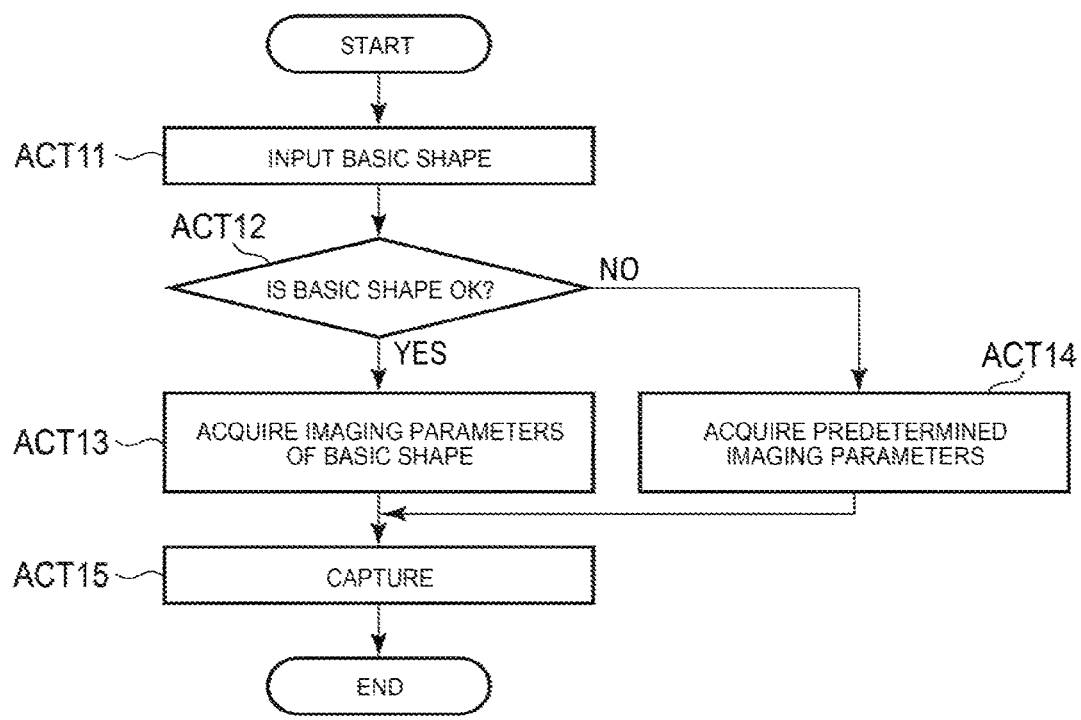
FIG. 5 is a flowchart illustrating an operation example of a control device according to the first embodiment.

FIG. 5 is a flowchart for describing an operation example of the control device 10. Here, it is assumed that the article A is set on the turntable 32.

First, the processor 11 of the control device 10 receives the input of the basic shape of the article A through the input/output device 20 (ACT 11). When receiving the input of the basic shape of the article A, the processor 11 determines whether the basic shape of the article A has been acquired (ACT 12).

If it is determined that the basic shape of the article A has been acquired (ACT 12, YES), the processor 11 refers to the parameter table and acquires imaging parameters corresponding to the acquired basic shape (ACT 13).

If it is determined that the basic shape of the article A may not be acquired (basic shape is unknown) (ACT 12, NO), the processor 11 acquires the predetermined imaging parameters (ACT 14).

In the case of acquiring the imaging parameters according to the basic shape (ACT 13) or in the case of acquiring the predetermined imaging parameters (ACT 14), the processor 11 images the article A based on the acquired imaging parameters (ACT 15).

When the article A is imaged, the processor 11 ends the operation.

If the basic shape of the article A is unknown, the processor 11 may end the operation.

Further, the imaging device 30 may be provided with a movable camera. In this case, the processor 11 moves the camera according to the imaging parameters to image the article A at a predetermined angle.

Further, the input/output device 20 may be formed integrally with the control device 10.

Further, the processor 11 may acquire imaging parameters from an external device.

Further, the processor 11 may set a plurality of basic shapes for the article. For example, the processor 11 may set the basic shape according to the part of the article. Further, the processor 11 may set imaging parameters corresponding to each part in order to image each part of the article. That is, the processor 11 captures images with different imaging parameters for each part of the article.

The image processing system configured as described above acquires the basic shape of an article that generates dictionary information. The image processing system sets imaging parameters necessary for generating dictionary information based on the basic shape. The image processing system images the article according to the set imaging parameters. As a result, the image processing system may avoid capturing of unnecessary images for generating dictionary information. Therefore, the image processing system may properly image the article.

In addition, the image processing system includes cameras that images an article from the upper part, the side part, and the lower part. As a result, the image processing system may capture necessary images without requiring the operator to rotate the article or the like.

Second Example

Next, a second embodiment will be described.

The image processing system according to the second embodiment is different from the image processing system 1 according to the first embodiment in that the processor 11 determines the basic shape of an article. Therefore, the same reference numerals are given to the other points and the detailed description is omitted.

Figure 6:
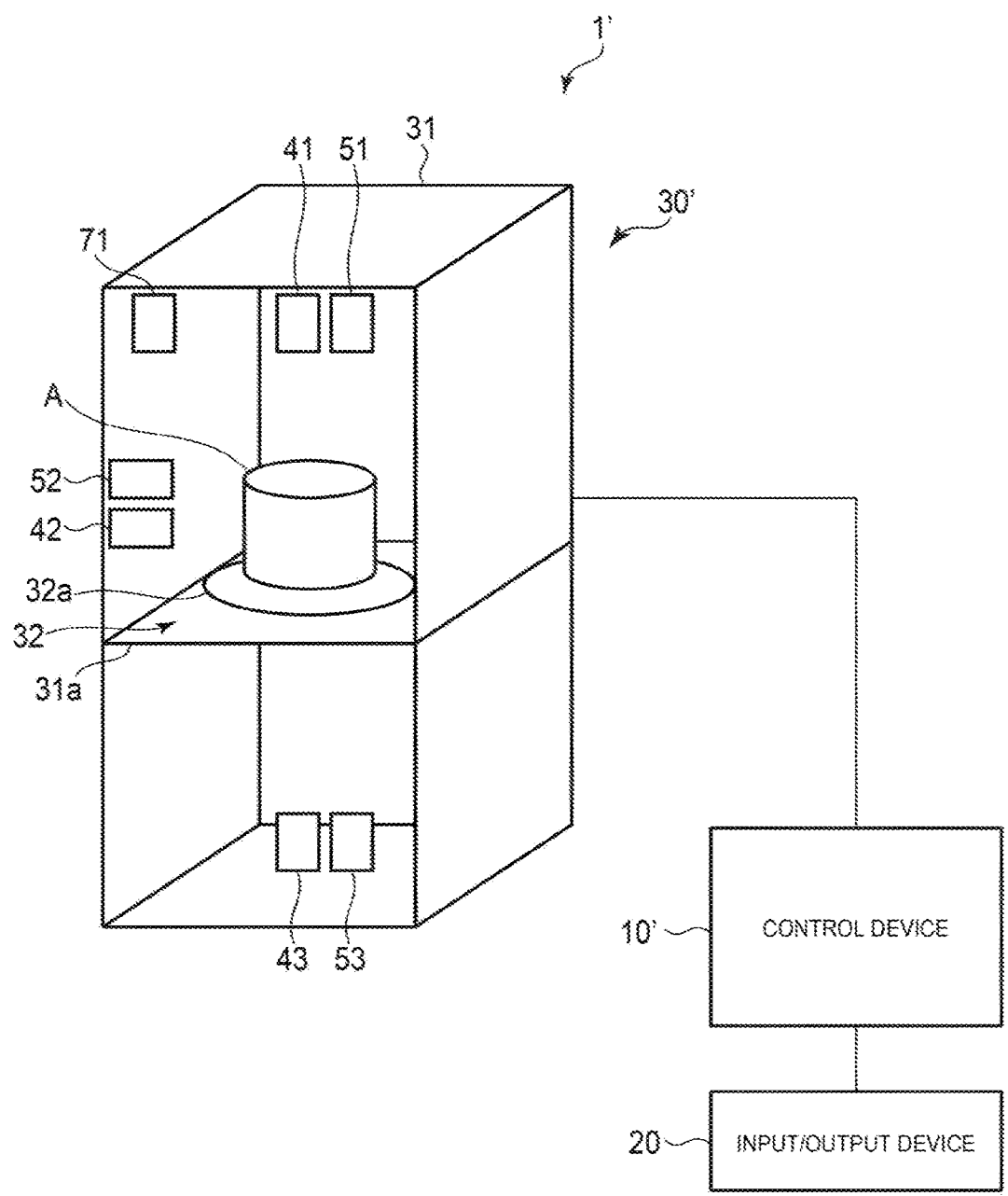
FIG. 6 is a block diagram illustrating a configuration example of an image processing system according to a second embodiment.

FIG. 6 shows a configuration example of an image processing system 1' according to the second embodiment. As shown in FIG. 6, the image processing system 1' includes a control device 10', an input/output device 20, and an imaging device 30'. The imaging device 30' includes a distance sensor 71.

The distance sensor 71 is installed inside the housing 31. Here, the distance sensor 71 is installed downward on the top side of the housing 31. The distance sensor 71 measures the distance (for example, the distance from the distance sensor 71 or the distance from the plane horizontal to the distance sensor 71) from a reference point or a reference plane to each part of the article.

For example, the distance sensor 71 measures the distance based on the reflected light of the light (visible light or invisible light) radiated from a light source. For example, the distance sensor 71 may perform a time-of-flight (ToF) method for measuring a distance to a measurement target based on the time until the radiated light is reflected by the measurement target and reaches the distance sensor 71.

Further, the distance sensor 71 may be constituted with a 3D camera. The distance sensor 71 may calculate the distance based on the parallax of each image captured by the two cameras.

The configuration of the distance sensor 71 is not limited to a specific configuration.

Next, a configuration example of the control device 10' will be described.

Figure 7:
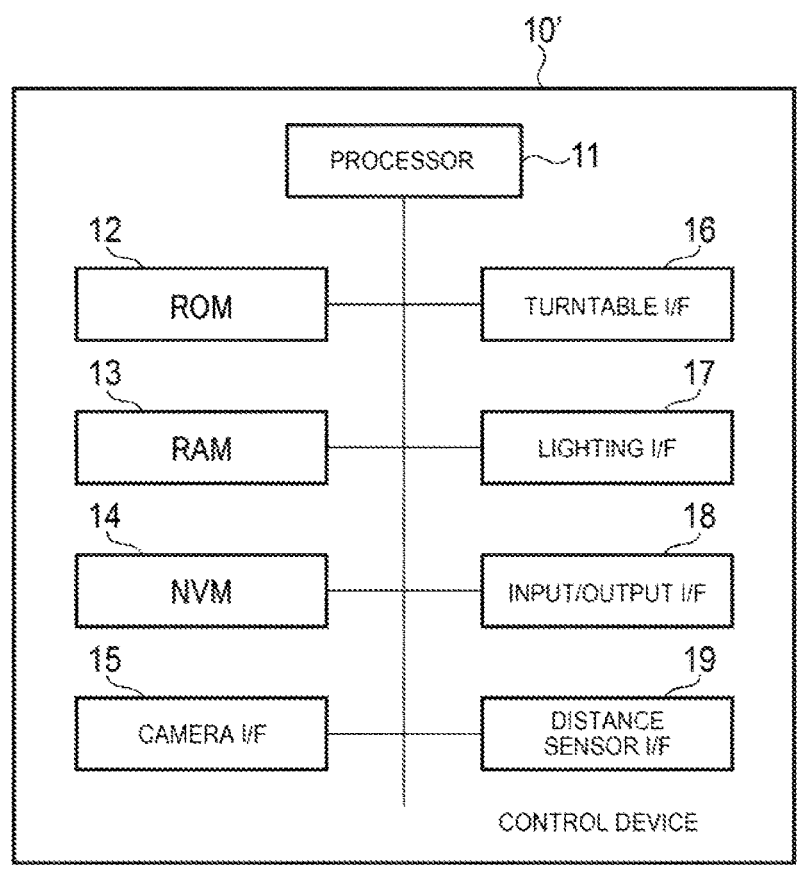
FIG. 7 is a block diagram illustrating a configuration example of a control device according to a second embodiment.

FIG. 7 is a block diagram showing a configuration example of the control device 10'. As FIG. 7 shows, the control device 10' includes a distance sensor interface 19. The processor 11 and the distance sensor interface 19 are connected to each other via a data bus or the like.

In addition to the configuration as shown in FIG. 7, the control device 10' may further have a configuration according to the particular application, or a specific configuration may be excluded from the control device 10'.

The distance sensor interface 19 is an interface for transmitting and receiving data to and from the distance sensor 71. For example, the distance sensor interface 19 transmits a signal for instructing the distance sensor 71 to measure the distance, under the control of the processor 11. Further, the distance sensor interface 19 acquires a signal indicating the measured distance from the distance sensor 71. For example, the distance sensor interface 19 may support a USB connection.

Next, functions realized by the control device 10' will be described. The control device 10' realizes the following functions in addition to the functions realized by the control device 10. The functions realized by the control device 10' are realized by the processor 11 executing a program stored in the NVM 14 or the like.

The processor 11 has a function of determining the basic shape of the article A set on the turntable 32.

For example, the processor 11 measures the distance from the reference point or reference plane to each part of the article A by using the distance sensor 71. The processor 11 determines the basic shape based on the measured distance. For example, the processor 11 determines the shape of the top side, the side, and the like of the article A based on the measured distance and determines the basic shape of the article A.

Further, the processor 11 images the article A by using the cameras 41 to 43. The processor 11 determines the basic shape based on the captured image. For example, the processor 11 extracts the edges of each image and determines the shape of the top side, the side, the bottom side, and the like of the article A. The processor 11 determines the basic shape of the article A based on each determined shape.

The processor 11 may determine the basic shape based on an image captured by using any one or two of the cameras 41 to 43.

Further, the imaging device 30' may further include a camera that captures an image for determining the basic shape. The processor 11 may determine the basic shape of the article A based on the image captured by the camera.

Further, the processor 11 may determine the basic shape of the article A based on the distance measured by using the distance sensor 71 and the images captured by using the cameras 41 to 43.

Here, it is assumed that the processor 11 determines the basic shape of the article A based on the distance measured by using the distance sensor 71 and the images captured by using the cameras 41 to 43.

The method by which the processor 11 determines the basic shape of the article A is not limited to a specific method.

Further, the processor 11 has a function of acquiring imaging parameters corresponding to the basic shape of the article A.

In a case where the determination of the basic shape is successful, the processor 11 refers to the parameter table and acquires imaging parameters corresponding to the determined basic shape. The processor 11 sets the acquired imaging parameters.

In a case where the determination of the basic shape fails, the processor 11 may acquire predetermined imaging parameters.

Next, an operation example of the control device 10' will be described.

Figure 8:
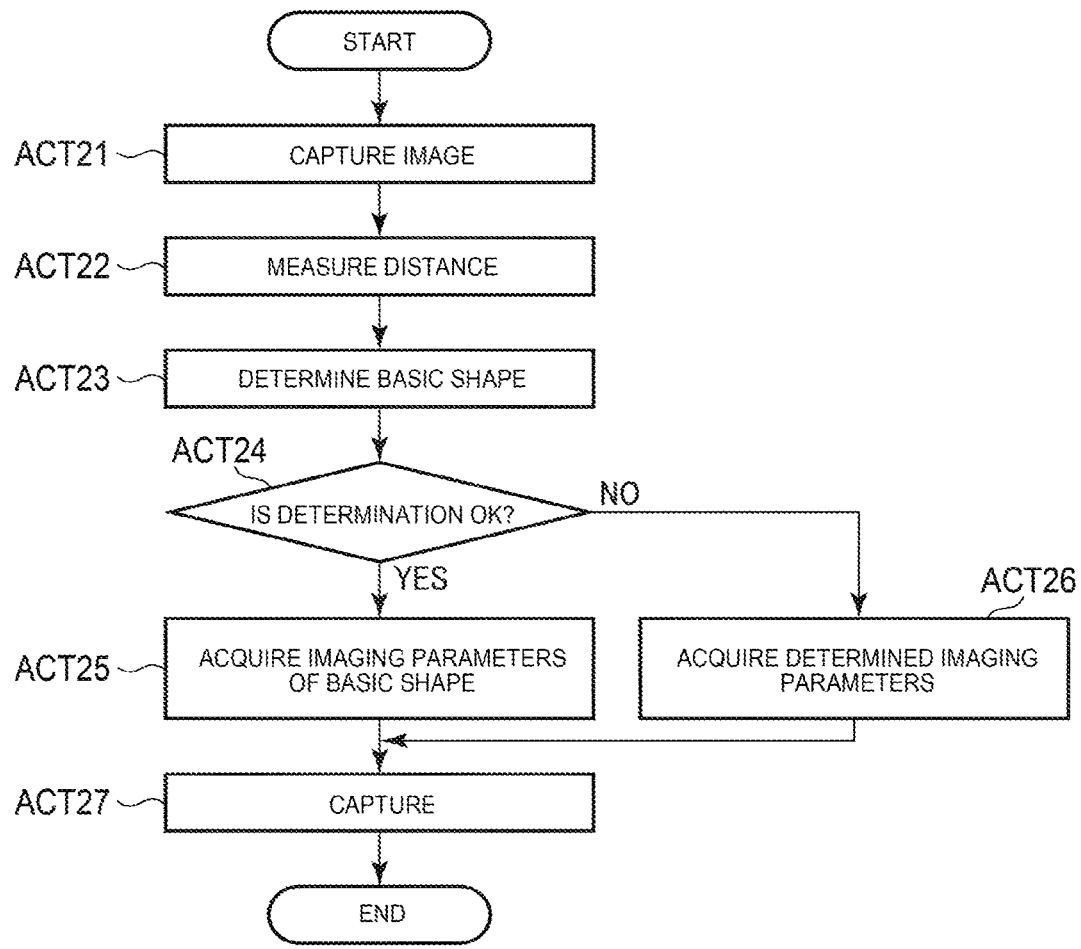
FIG. 8 is a flowchart illustrating an operation example of the control device according to the second embodiment.

FIG. 8 is a flowchart for describing an operation example of the control device 10'. Here, it is assumed that the article A is set on the turntable 32.

First, the processor 11 of the control device 10 uses the cameras 41 to 43 to image the article A (ACT 21). When imaging the article A, the processor 11 measures the distance by using the distance sensor 71 (ACT 22).

When the distance is measured, the processor 11 determines the basic shape of the article A based on the captured image and the measured distance (ACT 23).

When the determination of the basic shape of the article A is successful (ACT 24, YES), the processor 11 refers to the parameter table and acquires imaging parameters corresponding to the determined basic shape (ACT 25).

If the determination of the basic shape of the article A fails (ACT 24, NO), the processor 11 acquires the predetermined imaging parameters (ACT 26).

In the case of acquiring the imaging parameters according to the basic shape (ACT 25) or in the case of acquiring the predetermined imaging parameters (ACT 26), the processor 11 images the article Abased on the acquired imaging parameters (ACT 27).

When the article A is imaged, the processor 11 ends the operation.

The imaging device 30 may include a plurality of distance sensors. Each distance sensor measures distances from different reference points or reference planes. The processor 11 may determine the basic shape of the article based on the distance measured by each distance sensor.

The image processing system configured as described above determines the basic shape of the set article. The image processing system sets imaging parameters according to the determined basic shape. The image processing system images the article according to the set imaging parameters. As a result, the image processing system may set appropriate imaging parameters even if the operator does not input the basic shape.

While several embodiments of the present exemplary embodiment have been described, these embodiments have been presented by way of example and are not intended to limit the scope of the exemplary embodiments. These novel embodiments may be implemented in various other forms, and various omissions, substitutions, and changes may be made without departing from the spirit of the exemplary embodiments. These embodiments and modifications thereof are included in the scope and gist of the exemplary embodiments and are included in the exemplary embodiment described in the claims and the equivalent scope thereof.

What is claimed is:

1. An image processing system comprising:
a housing comprising:
a turntable configured to support and rotate an article, the turntable including a transparent disc;
at least one camera, installed on respective sides of the housing, configured to capture an image of the article; and
a partition separating the housing into an upper portion and a lower portion, the transparent disc disposed on the partition,
the at least one camera including a first camera disposed in the upper portion and arranged to image a top side of the article, a second camera arranged to image a horizontal side of the article, and a third camera disposed in the lower portion and arranged to image a bottom side of the article through the transparent disc; and
a processor configured to acquire a basic shape of the article and to image the article using imaging parameters corresponding to the basic shape,
wherein one of the imaging parameters is a number of captured images of the article, the number of captured images being different for at least two different basic shapes.

2. The system according to claim 1, wherein the imaging parameters include an angle at which the article is imaged.

3. The system according to claim 1, further comprising:
an input/output configured to receive an input of the basic shape,
wherein the processor is configured to acquire the basic shape input through the input/output.

4. The system according to claim 3, wherein the input/output includes at least one of a keypad, a keyboard, or a touch pad.

5. The system according to claim 1, wherein the processor is configured to determine the basic shape.

6. The system according to claim 1, further comprising:
at least one distance sensor configured to measure a distance to each part of the article,
wherein the processor is configured to determine the basic shape based on the distance measured.

7. The system according to claim 6, wherein the distance sensor includes a three-dimensional camera.

8. The system according to claim 1, further comprising:
a first light arranged in the housing to illuminate the top side of the article;
a second light arranged in the housing to illuminate the horizontal side of the article; and
a third light arranged in the housing to illuminate the bottom side of the article through the transparent disc.

9. An image processing system comprising:
an imaging device, inside a housing, that includes at least one camera configured to capture images of an article, the housing including a partition separating the housing into an upper portion and a lower portion, the at least one camera including a first camera disposed in the upper portion and arranged to image a top side of the article, a second camera arranged to image a horizontal side of the article, and a third camera disposed in the lower portion and arranged to image a bottom side of the article; and
a processor configured to acquire a basic shape of the article and to image the article using imaging parameters corresponding to the basic shape,
wherein one of the imaging parameters is a number of the captured images, the number of captured images being different for at least two different basic shapes.

10. The system according to claim 9, wherein the imaging device includes a turntable disposed on the partition and configured to support and rotate the article.

11. The system according to claim 9, wherein the imaging device includes at least one light configured to illuminate the article.

12. The system according to claim 9,
wherein the imaging parameters include an angle at which the article is imaged.

13. The system according to claim 9, further comprising:
an input/output configured to receive an input of the basic shape,
wherein the processor is configured to acquire the basic shape input through the input/output.

14. The system according to claim 9,
wherein the processor is configured to determine the basic shape.

15. The system according to claim 9, further comprising:
at least one distance sensor configured to measure a distance to each part of the article,
wherein the processor is configured to determine the basic shape based on the distance measured.

16. A method of operating an image processing system including (a) a housing having a turntable configured to support and rotate an article and at least one camera, installed on respective sides of the housing, the housing including a partition separating the housing into an upper portion and a lower portion, the at least one camera including a first camera disposed in the upper portion and arranged to image a top side of the article, a second camera arranged to image a horizontal side of the article, and a third camera disposed in the lower portion and arranged to image a bottom side of the article, the at least one camera configured to capture an image of the article, and (b) a processor configured to acquire a shape of the article and to image the article using imaging parameters corresponding to the shape, the method comprising:
rotating, by the turntable, the article;
capturing, by the at least one camera, an image of the article;
acquiring, by the processor, the shape of the article; and
imaging, by the processor, the article using imaging parameters corresponding to the shape,
wherein one of the imaging parameters is a number of captured images of the article, the number of captured images being different for at least two different basic shapes.

17. The image processing method of claim 16, wherein the imaging parameters include an angle at which the article is imaged.

18. The image processing method of claim 16, wherein the image processing system further includes a distance sensor, the method further comprising:
measuring, by the distance sensor, a distance to each part of the article, wherein the basic shape is determined based on the distance measured.

19. The image processing method of claim 16, further comprising:
obtaining, by the processor, the imaging parameters corresponding to the basic shape from a parameter table in memory, the parameter table having the imaging parameters for a plurality of basic shapes.

* * * * *